B. HAUSER.
EMBROIDERING.
APPLICATION FILED AUG. 1, 1919.

1,382,976.

Patented June 28, 1921.
4 SHEETS—SHEET 1.

Inventor:
Benedikt Hauser,
By Henry Orth Jr.
Atty.

B. HAUSER.
EMBROIDERING.
APPLICATION FILED AUG. 1, 1919.

1,382,976.

Patented June 28, 1921.
4 SHEETS—SHEET 2.

Inventor:
Benedikt Hauser
By Henry Orth
atty

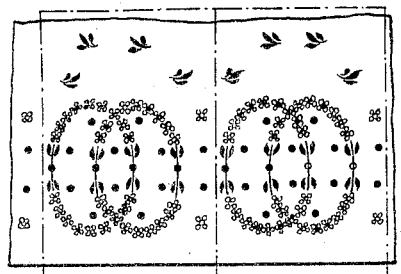
Fig. 21
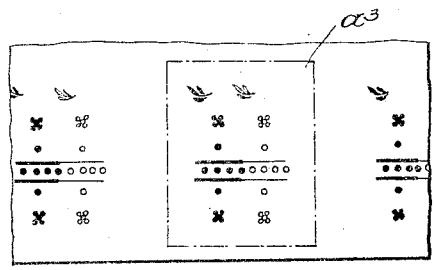
Fig. 17
Fig. 18
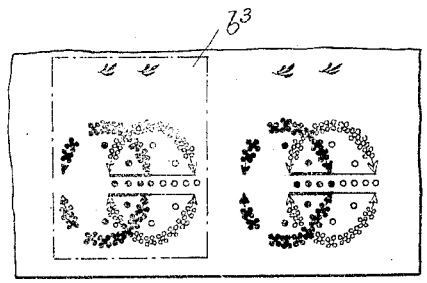
Fig. 19
Fig. 20
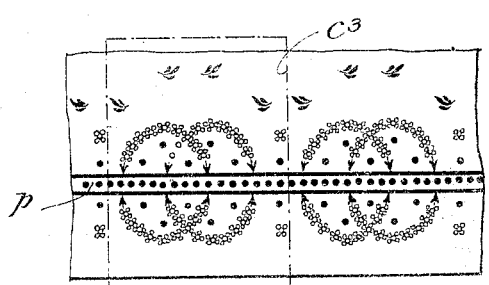
Fig. 16
Inventor:
Benedikt Hauser,
atty.

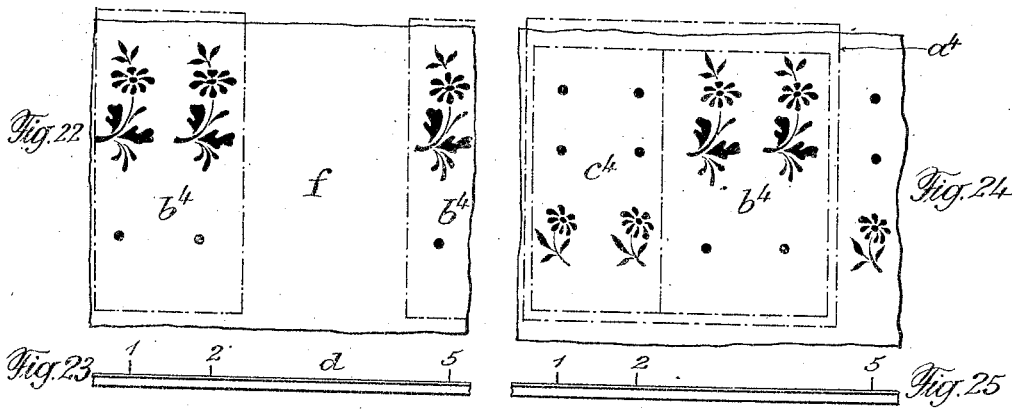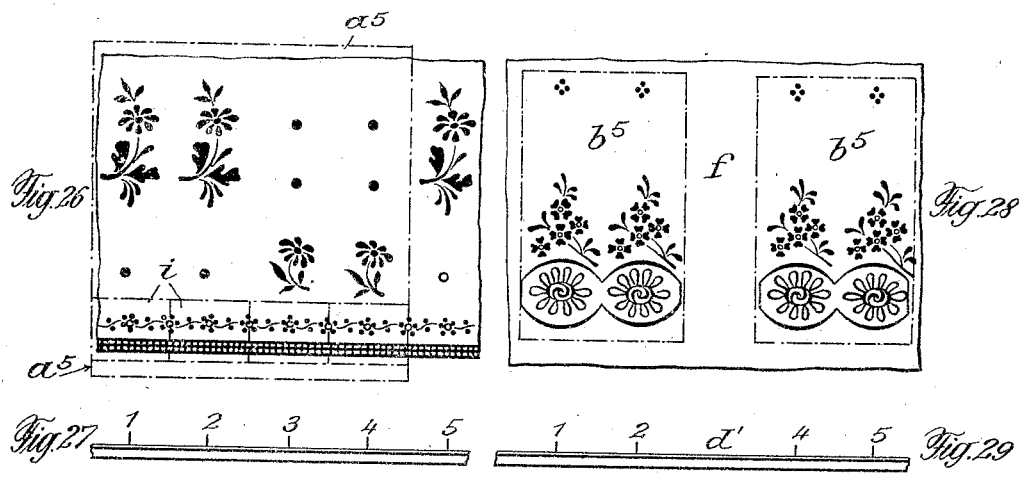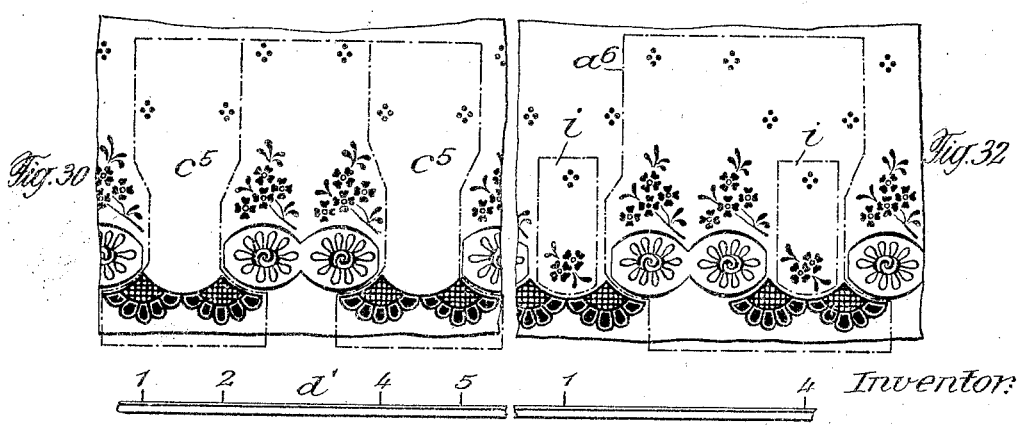

UNITED STATES PATENT OFFICE.

BENEDIKT HAUSER, OF ROMANSHORN, SWITZERLAND.

EMBROIDERING.

1,382,976.  Specification of Letters Patent.  Patented June 28, 1921.

Application filed August 1, 1919. Serial No. 314,689.

*To all whom it may concern:*

Be it known that I, BENEDIKT HAUSER, a citizen of the Republic of Switzerland, residing at Romanshorn, Switzerland, have invented certain new and useful Improvements in Embroidering; and I do hereby declare the following to be a clear, full, and exact description of the invention, such as will enable others skilled in the art to which it appertains to make and use the same, reference being had to the accompanying drawings, and to letters or figures of reference marked thereon, which form a part of this specification.

In some embroderies the stitched or embroidered decorations are repeated a large number of times, side by side, in strips.

These strips are sold in the market as edgings, flouncings, &c., under the general name of embroideries and are used in making dresses, children's garments, flounces, &c.

Each stitched or embroidered design is designated by the manufacturer as a repeat, and each repeat is made with a single needle on the needle rail of an embroidering machine, usually of the pantograph type. Each needle rail carries a large number of needles regularly spaced apart. In embroidering an edging all needles operate within the range of a single repeat and fully embroider a design of the strip of repeated designs.

The object of the invention is an improved method of embroidering patterns of richer and more diversified design at lesser cost than at present, and consists in shifting the fabric and needles relatively to one another, so that each needle will have a range over a width of fabric greater than the normal range of lateral movement permitted during the embroidering operation of the machine. This will result in larger, *i. e.* wider repeat designs which may be any multiple of the normal lateral range of a needle or repeat.

In order that my invention may be clearly understood, reference will be made to the accompanying drawings, in which like parts are similarly designated.

Figure 1 illustrates a partion of a strip of embroidery or edging made according to prevailing methods.

Fig. 2, the corresponding arrangement of the needles on the needle rail for making this strip.

Figure 6:
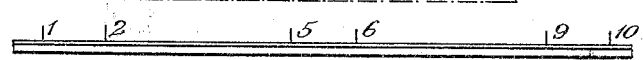

Fig. 6 the position of the needles after relative lateral shifting of fabric and needles for completing the design.

Figure 7:
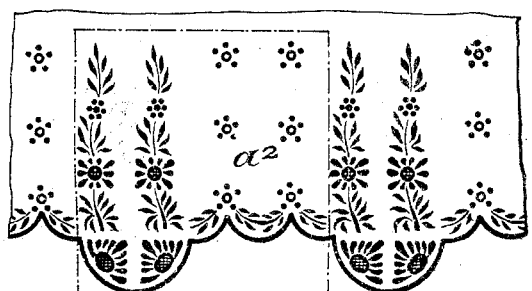
Figure 8:
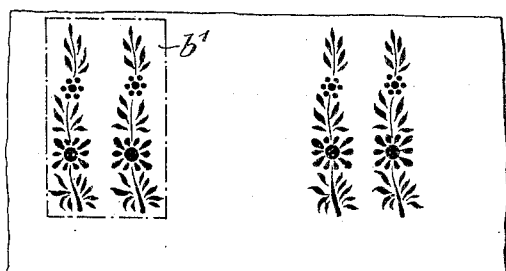

Fig. 7 shows another design.

Figs. 8–15 illustrate various steps in making the design shown in Fig. 7.

Fig. 16 illustrates a design having an embroidered band, and

Figs. 17–20 illustrate the steps in making this band design.

Fig. 21 is a design similar to the design of Fig. 16, with the band omitted.

Figs. 22–27 illustrate the embroidering of a design where a plurality of repeats are first made, separated by spaces in which a plurality of other repeat designs are subsequently embroidered.

Figs. 28–33 represent the steps of embroidering a design in the manner shown by a plurality of needles, with the addition of a single repeat.

Figure 1:
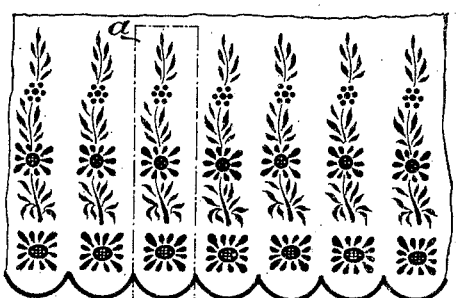
Figure 2:
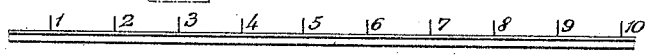
Figure 3:
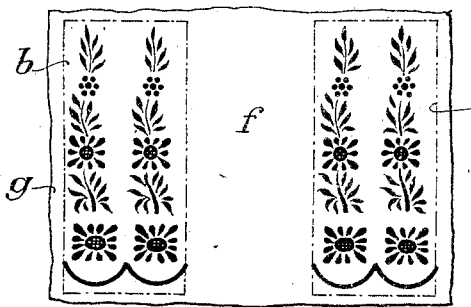
Fig. 3 shows a portion of a partially completed design made in accordance with my invention.
Figure 4:
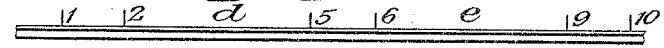
Fig. 4 illustrates the arrangement of needles on the needle rail for making this partial design.

In Fig. 1 I have illustrated the customary embroidery or edging where each of the succeeding repeats or elements *a* is a duplicate of the others, each element being made by one of the needles 1—10 on the needle rail, shown diagrammatically in Fig. 2. By the prevailing method of embroidering, the variation of the design consists only in changing the configuration of the design within the area *a* of operation of the successive equally spaced needles. Each repeat *a* inclosed in dotted lines, Fig. 1, is followed by a like repeat.

By my invention I can vary the design by first embroidering the repeat portions, separated from one another by unembroidered portions, whose lateral width is equal to a single repeat or a multitude of the repeats. This I do by removing the needles from the needle rail corresponding to the unembroidered portion. Then I shift the fabric and needles relatively to one another, and embroider between the repeats already made.

In Figs. 3–6 I have illustrated the steps I use in diversifying the design shown in Fig. 1, and in these figures I have elected to use two repeats as illustrated in Fig. 1, separated by two repeats of another design, so that the needles of the needle rail will operate in pairs. Other proportioning may be used if desired.

Figure 5:
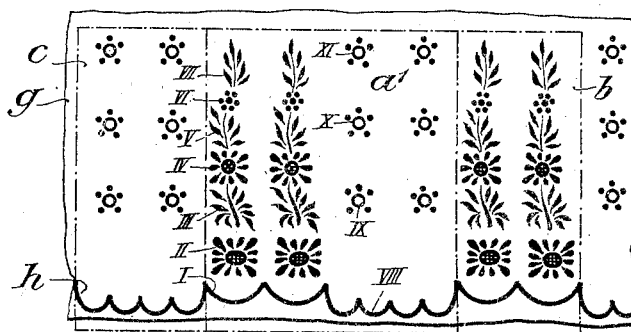
Fig. 5 illustrates the finished design.

For the purpose of making the design shown in Fig. 5, I remove from the needle rail alternate pairs of needles 3, 4—7, 8, &c., leaving spaces $d$ and $e$ in which there are no needles. I then embroider on the ground fabric $g$ the design portions consisting of pairs of repeats $a$ Fig. 1, namely the portions $b$ separated by unembroidered portions $f$. I then effect a relative lateral displacement of fabric and needles, so that the pairs of needles 1, 2—5, 6, &c., will embroider in the unembroidered spaces $f$ and produce the differently shaped but congruent designs $c$ between the designs $b$ and obtain the design $a'$ whose width is a multiple of single repeats. Thus a strip of the design shown in Fig. 5 is obtained comprising a plurality of design portions alternating with different shaped but associated portions. In other words, the patterns $a'$ each consist of two rows of congruent effects (I to VII) and two adjacent congruent rows of other effects (VIII to XI) arranged at the side of the first two rows. In a strip of edging such as shown in Fig. 5, it is immaterial whether uninterrupted border embroidery, such as the so called scalloped button-hole embroidery $h$ is present or not.

In Fig. 7 I have illustrated another pattern, each repeated design $a^2$ being large and a multiple of single repeats. This is produced by the method herein described in combination with a known method of forming effects which are reflected or reversed images of one another.

Figure 9:
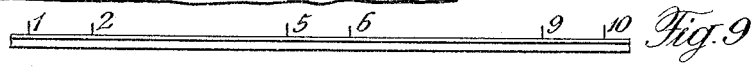
Figure 10:
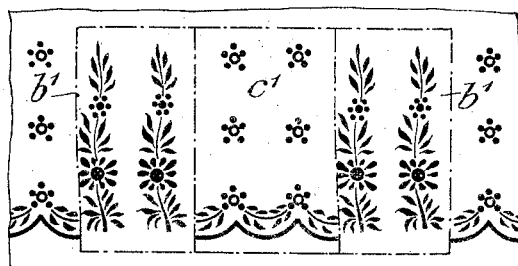
Figure 11:
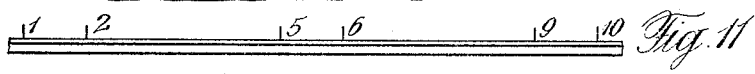
Figure 12:
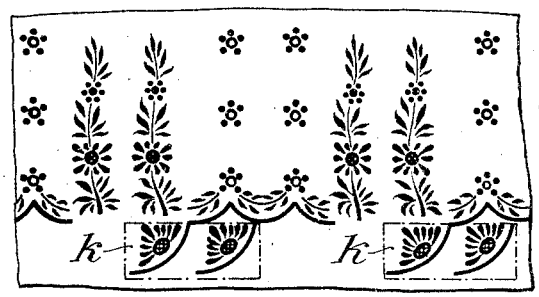
Figure 13:
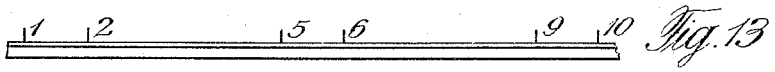

In this instance the needles 1, 2—5, 6—9, 10, &c., Fig. 9 are used to embroider the pairs of repeat designs $b'$. The ground fabric is then moved to the right into the position shown in Fig. 10, in relation to the needles Fig. 11, so that the same needles will embroider the pairs of effects shown at $c'$ on the unembroidered portion of the ground fabric between the effects $b'$. The ground fabric is then moved to the left from the position shown in Fig. 10 to that shown in Fig. 12, namely only one-half the distance between the initial pairs of repeats, and the same needles are used to embroider the pairs of effects $k$ Fig. 12, on the edge of the fabric. Then the fabric is shifted to the right into the position shown in Fig. 14 with reference to the needles shown in Fig. 15, whereupon the embroidery effects $m$ are produced in a known manner, which are the reverse or reflected images of those $k$.

Figure 14:
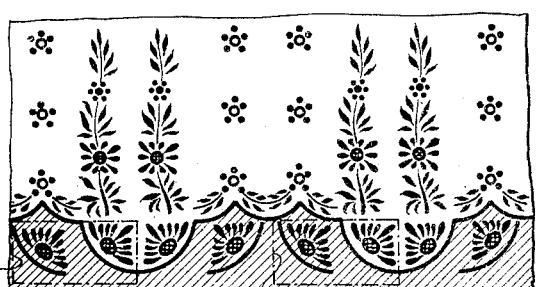
Figure 15:
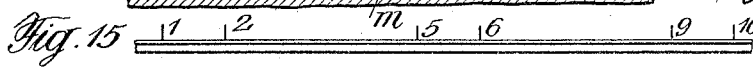

Finally the hatched portion of Fig. 14 is cut off, leaving an embroidered edging, as shown in Fig. 7, being a combination of two pairs of repeats $b'$ and $c'$ with one-half of two other pairs of repeats $k$ and $m$.

In Fig. 16 is shown an embroidered strip the design of which is composed of a large number of repeats, containing a band pattern $p$ which is embroidered in two working phases by means of the same needles.

In order to embroider a design such as $c^3$ of large repeat, the needles 1, 2—5, 6—9, 10, Fig. 18 occupy the positions shown relatively to Fig. 17, and are caused to embroider the effects $a^3$ Fig. 17. The fabric is then moved into the position shown in Fig. 19, so that it is displaced relatively to the needles, Fig. 20, and the same needles are caused to embroider the congruent portions $b^3$ constituting with the first embroidered portion $a^3$ the pattern $c^3$ Fig. 16.

In Fig. 19 the portions previously embroidered and shown in Fig. 17 have been omitted for the sake of clearness.

In order to illustrate the advantage obtained by proceeding in accordance with my novel method, the stitch effects present on the stitcher's or operator's card board design, which is mounted on the pantograph pattern board of the embroidering machine, are shown in thicker lines in Figs. 17 and 19. The stitches in that part of the embroidery indicated by light lines and open design in these two figures, made by needles 2, 6, 10, &c., do not have to be reckoned up by the operator.

Thus, since only one-half of each of the pairs of $b$, $c$, $b'$, $c'-k$, are designed on the pattern board, and are followed by the operator when he shifts the pantograph, only one-half of the stitches or portions of the patterns have to be taken into consideration in calculating the operators' wages, notwithstanding that the patterns are fuller and more diversified.

The method can be carried into effect in embroidering shadow embroidery, as well as open-work embroidery.

Fig. 21 shows a pattern embroidered in a design similar to that shown in Fig. 16, but having the band $p$ omitted.

The patterns embroidered in accordance with the method above described can be further enhanced by congruent portions made by single needles, $i.$ $e.$, one for each successive repeat across the fabric, or such single needles may each be caused to operate at a multiple repeat. For example, the needles 1, 2—5, 6, &c., assume the position Fig. 23 relatively to the fabric shown in Fig. 22. There is, as before, the space $d$ between the groups of needles that embroider the portions $b^4$ leaving the portion $f$ of the ground fabric unembroidered. Upon a relative movement between the fabric and needles the positions shown in Figs. 24 and 25 are assumed, the portions $c^4$ are embroidered by each group of needles, so that the design $a^4$ is obtained.

In order to obtain a richer pattern, $a^x$, Fig. 26, the pattern portions $i$ are embroidered by successive single needles, regularly spaced apart the distance of a single repeat.

Figs. 28 to 33 illustrate a further extension of the use of single needles in conjunction with groups of needles.

The partial designs $b^5$ are first embroidered, each by a group of needles, in this instance a pair of needles for each group, and every third needle is omitted leaving the space $d'$ of one repeat on the needle rail, Figs. 28 and 29. Upon relative displacement of needles and fabric, Figs. 30 and 31, the portions $c^5$ are embroidered by the same groups of needles. Then the portions $i$ are made by the needles 1—4—7, &c., spaced apart a multiple of a repeat, and the needles 2, 5, &c., are either removed or unthreaded, so that they will not embroider.

I claim:

1. The method of making embroidery strips presenting patterns of large repeats, which comprises embroidering designs forming portions of the pattern with needles less in number than the number of single repeats in the width of the pattern, then effecting relative horizontal displacement of fabric and needles to an amount greater than the width of a single repeat, and embroidering design portions between the first embroidered portions with the same needles and needle spacing.

2. The method of making embroidery strips, as edgings, flouncings, &c., presenting patterns of a width equal to a large number of repeats, which comprises making designs forming portions of the pattern with groups of needles less in number than the number of single repeats in the width of the pattern, then effecting relative horizontal displacement of fabric and needles to an amount greater than the width of a single repeat and embroidering between the first embroidered portions with the same needles and needle spacing.

3. The method of making embroidery strips, which comprises embroidering designs forming portions of a pattern with groups of needles less in number than the number of single repeats in the width of the pattern, then effecting relative horizontal displacement of fabric and needles, embroidering with the same needles the spaces between the previous embroidery and finally relatively displacing the fabric and frame and embroidering with single needles design portions associable with the groups of pattern portions previously embroidered.

4. The method of making embroidery strips presenting patterns of large repeat, which comprises embroidering design portions of the pattern with needles less in number than the number of single repeats in the width of the pattern, then effecting relative horizontal displacement of fabric and needles and embroidering with the same needles associated design portions between those previously embroidered, effecting relative horizontal displacement of fabric and needles and embroidering with single needles pattern portions associable with the two pattern portions previously embroidered.

5. An embroidered strip comprising different groups of pattern portions, each group consisting of at least two congruent pattern portions, and said groups alternating side by side.

6. An embroidered strip, comprising alternating groups of pattern portions side by side, and similar groups of pattern portions associable with both of the aforementioned groups and laterally displaced relatively to each of the aforementioned groups.

7. An embroidered strip, comprising groups of pattern portions, and alternating groups of pattern portions associated with the aforementioned groups and displaced relatively to said aforementioned groups, and single pattern portions associated with either or both of said groups.

In testimony that I claim the foregoing as my invention, I have signed my name.

BENEDIKT HAUSER.